United States Patent Office 2,707,178
Patented Apr. 26, 1955

2,707,178

STABILIZERS FOR VINYL CHLORIDE RESINS

Joseph Edward Wilson, New Brunswick, N. J., assignor to Union Carbide and Carbon Corporation, a corporation of New York No Drawing. Application June 21, 1952,
Serial No. 294,913

17 Claims. (Cl. 260—45.5)

Those artificial resins known collectively as vinyl resins have attained wide recognition in the field of plastics. Of this class, the resins which are obtained by the polymerization of a vinyl halide, usually vinyl chloride, are probably most widely known, particularly the resins such as are formed by the conjoint polymerization of vinyl chloride with vinyl esters of aliphatic acids or with other unsaturated polymerizable compounds.

It is well known that these resins have the somewhat unfortunate property of tending to decompose when heated to the extent which is required in their formation and fabrication into various products. Generally this decomposition is evidenced by the development of color in the resin and has been attributed to the liberation of hydrogen chloride from the polymer. To overcome this tendency various compounds have been added to stabilize the resin and function to either neutralize the acid or combine readily with hydrogen halides to form relatively inert compounds.

Generally, the addition of these substances which neutralize the acid or combine with hydrogen chloride have reduced the development of color in these resins caused by the liberation of hydrogen chloride. However, it has been noted that there still remains some color development, which in certain instances may be as pronounced as that caused by the liberation of hydrogen chloride. This additional decomposition, which for present purposes may be termed secondary decomposition, is caused by oxidation of the polymer and/or by the higher temperatures required for processing, and aside from color development results in impairment of strength, elasticity and electrical insulating capacity. Moreover, the instability of other ingredients of the composition, such as plasticizers, lubricants and dyes, may also contribute to their secondary decomposition.

It is well known that substances which inhibit decomposition in vinyl chloride resins caused by the liberation of hydrogen chloride do not necessarily inhibit decomposition caused by oxidation, heat, or the instability of the incorporated modifiers. Consequently, to overcome this secondary decomposition, it is necessary to incorporate additional or secondary stabilizers. Various substances have been proposed as secondary stabilizers for vinyl chloride resins, and in general they have not met with wide acceptance. In many instances this nonacceptance is due to the volatility of these prior art compounds. For example, the simple aliphatic mercaptols were found to be quite effective for this purpose; however, as they are quite volatile at resin-processing temperatures, unpleasant and odorous gases are produced. Working conditions are naturally unfavorable, and sometimes unbearable, and thus resort must be had to other and perhaps less effective secondary stabilizers. Another disadvantage of the simple aliphatic mercaptols as secondary stabilizers is that they tend to give the formed product a noticeable sulphur odor. The need, therefore, exists for a new secondary stabilizer which is effective and which is not subject to the disadvantages possessed by the presently known compounds.

Accordingly, the present invention relates to a class of sulphur-containing organic compounds which may be effectively and efficiently employed as stabilizers for vinyl chloride resins to inhibit decomposition and the resulting discoloration produced by causes other than the liberation of hydrogen chloride. The sulphur-containing substances of this invention are effective as secondary stabilizers and are compatible with vinyl resins in the proportions necessary for such stabilization. Furthermore, they have the additional advantage of chemical stability at processing temperatures.

The sulphur-containing stabilizers of the instant invention consists of a class of resinous polyesters of mercapto alcohols with dicarboxylic acids. The mercapto alcohols which may be employed to form resinous stabilizers for vinyl resins contain at least one hydroxy group and at least one mercapto group, although additional hydroxy and mercapto groups may be present. These mercapto alcohols have the general formula HS—Y—OH, wherein —Y— may be aliphatic, alicyclic, or aromatic. The preferred mercapto alcohols are those wherein —Y— is aliphatic, for example, mercapto methanol, mercapto ethanol, mercapto propanol, and mercapto butanol. Of course, it is not intended to limit the mercapto alcohols which may be employed to those containing only one mercapto and one hydroxy group. The dimercapto alcohols may be employed, for example, dimercapto propanol, dimercapto butanol, and other aliphatic dimercapto alcohols. Also employed are the mercapto diols such as mercapto propanediol and mercapto butanediol.

Any dicarboxylic acid may be employed with the mercapto alcohol to form a polymeric stabilizer for vinyl resins. The principle of the invention is the same irrespective of the polycarboxylic acid employed, and it is obvious that all compounds embraced within the term "dicarboxylic acid" are included within the scope of the invention irrespective of whether they are members of the aromatic, aliphatic, or alicyclic series of organic dicarboxylic acids. Within the class of dicarboxylic acids, representative acids have been used in the preparation of the polymeric stabilizers for vinyl resins, and the equivalency of the members of this class has been established. The dicarboxylic acids which have been thus employed include maleic acid, malonic acid, adipic acid, and succinic acid. Other examples of suitable dicarboxylic acids include oxalic, fumaric, glutaric, pimelic, suberic, azelaic, and sebacic acids.

The resinous polyesters which are employed as secondary stabilizers may be prepared by any of the known processes, for example, by the condensation polymerization of a mercapto alcohol and a dicarboxylic acid. In such process, the compounds are refluxed with a catalyst at elevated temperatures. The particular method of obtaining polymers is not important so far as the instant invention is concerned.

Vinyl resins which may be stabilized in accordance with the present invention include the polymers of vinyl chloride; conjoint polymers of vinyl chloride with vinyl esters of aliphatic acids, with esters of acrylic and methacrylic acids, and with acrylonitriles; after-chlorinated polymers; polymers of vinylidine chloride and conjoint polymers of vinylidine chloride with vinyl chloride; and other polymerizable compositions. The conjoint polymers which may be stabilized according to the invention are those containing at least 10% of vinyl chloride. Of particular importance are those conjoint polymers containing from 70% to 98% vinyl chloride and from 2% to 30% of another polymerizable compound.

The new stabilizers may be incorporated in the vinyl resin by any of the well known methods so long as a uniform distribution is obtained. In instances where the composition is to be employed in molding, extruding, or calendering, the stabilizer may be admixed with the vinyl resin on a two-roll mill or in a Banbury mixer. Generally the stabilizer, plasticizer, lubricant, and pigments are incorporated in a single operation. The amount of stabilizer added varies from 0.01% to 5% by weight of the resin. Greater amounts may be added; however, the effectiveness of such additional amounts is not appreciable, the critical and desirable range being 0.01% to 5%.

It has been found that the new stabilizers are effective to some extent as inhibitors of decomposition resulting from the liberation of hydrogen chloride. However, the most favorable results occur when a stabilizer for hydrogen chloride is also incorporated in the vinyl resin. The incorporation of both types of stabilizers produces a synergistic stabilizing effect. In other words, the effect produced by the use of a hydrogen chloride acceptor, otherwise known as a primary stabilizer, and the secondary stabilizer of the present invention in combination is greater than the sum of the stabilizing effects expected from the use of either alone. Consequently, it is now possible to obtain vinyl chloride resin products which will not decompose or discolor as a result of hydrogen chloride liberation, heat and/or oxidation, or by the instability of the various incorporated modifiers.

The polyester stabilizers are prepared by the condensation polymerization of a mercapto alcohol and a dicarboxylic acid in a solvent in the presence of a catalyst. For example, to prepare a polyester of mercapto ethanol and malonic acid, 1 mol. of the alcohol and 1 mol. of the acid are reacted in 200 cc. of benzene in the presence of 3 cc. of concentrated hydrochloric acid. The reaction is carried out by refluxing in benzene, the benzene being employed to carry off the water and the water being trapped in the customary fashion for this type of reaction. After approximately 72 hours of refluxing, about ⅔ of the theoretical amount of water had been collected. At this time the preparation was placed on a steam bath and the excess benzene evaporated off. More benzene was added and stirred into the polymer and the evaporation treatment on the steam bath repeated. The polymer was then placed in a vacuum oven to remove any traces of mercaptan remaining.

To illustrate the advantageous results of the instant invention, comparative tests were conducted in vinyl chloride compositions containing a hydrogen chloride acceptor (primary stabilizer), plasticizer, lubricant, and pigment. To one formulation there was added a secondary stabilizer falling within the scope of my invention. The compositions were milled at normal resin-processing temperatures, and samples thereof were subjected to a heat-aging test conducted at 158° C. in an air oven. The samples were periodically withdrawn and the reflectance of blue light measured, since differences in such reflectance provide a reliable index of the amount of discoloration. To measure the reflectance, a photometer was employed and adjusted to read 100% reflectance from a block of magnesium oxide.

Stabilization of chlorine-containing vinyl resins in accordance with my invention is more fully disclosed in the following examples:

*Example I*

Sheets of polyvinyl chloride compositions were prepared having the following formulations:

|  | Sample A, parts | Sample B, parts |
|---|---|---|
| Polyvinyl chloride | 100.0 | 100.0 |
| Di(2-ethylhexyl)phthalate | 40.0 | 40.0 |
| Lead silicate (primary stabilizer) | 2.0 | 2.0 |
| Stearic acid | 0.5 | 0.5 |
| Titanium dioxide | 1.0 | 1.0 |
| Resinous ester of mercapto ethanol with maleic acid |  | 0.1 |
|  | 143.5 | 143.6 |

The percent of blue light reflectance at 158° C. in air was as follows:

|  | 0.0 Hr. | 0.5 Hr. | 1.0 Hr. | 1.5 Hr. | 2.0 Hr. | 2.5 Hr. | 3.0 Hr. | 3.5 Hr. | 4.0 Hr. | 4.5 Hr. | 5.0 Hr. | 5.5 Hr. |
|---|---|---|---|---|---|---|---|---|---|---|---|---|
| Sample A | 87 | 85 | 83 | 82 | 75 | 68 | 52 | 43 | 38 | 35 | 31 | 23 |
| Sample B | 81 | 78 | 75 | 72 | 68 | 69 | 67 | 65 | 63 | 60 | 59 | 58 |

In terms of color appearance, after 5.5 hours in the oven, sample A was appreciably darker than sample B which contained the resinous ester of mercapto ethanol with maleic acid. The difference in color appearance is transferred to actual figures by examining the reflectance of blue light from each sample after heating, sample B reflecting over twice the amount of sample A.

*Example II*

Sheets of polyvinyl chloride compositions were prepared having the following formulations:

|  | Sample C, parts | Sample D, parts |
|---|---|---|
| Polyvinyl chloride | 100.0 | 100.0 |
| Di(2-ethylhexyl)phthalate | 40.0 | 40.0 |
| Lead phosphite (primary stabilizer) | 2.0 | 2.0 |
| Stearic acid | 0.5 | 0.5 |
| Titanium dioxide | 1.0 | 1.0 |
| Resinous ester of mercapto ethanol with maleic acid |  | 0.1 |
|  | 143.5 | 143.6 |

The percent of blue light reflectance at 158° C. in air was as follows:

|  | 0.0 Hr. | 1.0 Hr. | 2.0 Hr. | 3.0 Hr. | 4.0 Hr. | 5.0 Hr. | 6.0 Hr. |
|---|---|---|---|---|---|---|---|
| Sample C | 90 | 87 | 67 | 37 | 30 | 25 | 23 |
| Sample D | 70 | 69 | 69 | 66 | 75 | 68 | 69 |

In this instance lead phosphite was employed as the primary stabilizer, and the remaining components of the composition were the same as those of Example I. After being subjected to the air oven for six hours, sample C became charred while sample D containing my stabilizer was faintly cream in color. By actual measurement sample D reflected approximately three times the amount of blue light as sample C.

*Example III*

Sheets of polyvinyl chloride compositions were prepared having the following formulations:

|  | Sample E, parts | Sample F, parts |
|---|---|---|
| Polyvinyl chloride | 100.0 | 100.0 |
| Di(2-ethylhexyl)phthalate | 40.0 | 40.0 |
| Lead phosphite (primary stabilizer) | 2.0 | 2.0 |
| Stearic acid | 0.5 | 0.5 |
| Titanium dioxide | 1.0 | 1.0 |
| Resinous ester of mercapto ethanol and malonic acid |  | 0.1 |
|  | 143.5 | 143.6 |

The per cent of blue light reflectance at 158° C. in air was as follows:

|  | 0.0 Hr. | 1.0 Hr. | 2.0 Hr. | 3.0 Hr. | 4.0 Hr. | 5.0 Hr. | 6.0 Hr. |
|---|---|---|---|---|---|---|---|
| Sample E | 90 | 91 | 87 | 68 | 45 | 35 |  |
| Sample F | 85 | 83 | 81 | 79 | 83 | 84 | 79 |

The above comparison of blue light reflectance indicates that after six hours of heating sample F containing the resinous ester of mercapto ethanol and malonic acid reflected 79% of blue light, whereas sample E was quite charred, and the reflectance therefrom was negligible.

Example IV

Sheets of polyvinyl chloride compositions were prepared having the following formulations:

|  | Sample G, parts | Sample H, parts | Sample I, parts |
|---|---|---|---|
| Polyvinyl chloride | 100.0 | 100.0 | 100.0 |
| Di(2-ethylhexyl)phthalate | 40.0 | 40.0 | 40.0 |
| Lead silicate (primary stabilizer) | 2.0 | 2.0 | 2.0 |
| Stearic acid | 0.5 | 0.5 | 0.5 |
| Titanium dioxide | 1.0 | 1.0 | 1.0 |
| Resinous ester of mercapto ethanol and adipic acid | | 0.1 | |
| Resinous ester of mercapto ethanol and succinic acid | | | 0.1 |
|  | 143.5 | 143.6 | 143.6 |

The percent of blue light reflectance at 158° C. in air was as follows:

|  | 0.0 Hr. | 1.0 Hr. | 2.0 Hr. | 3.0 Hr. | 4.0 Hr. | 5.0 Hr. | 6.0 Hr. |
|---|---|---|---|---|---|---|---|
| Sample G | 87 | 84 | 71 | 47 | 34 | 28 | 27 |
| Sample H | 84 | 78 | 70 | 59 | 58 | 48 | 52 |
| Sample I | 82 | 74 | 74 | 64 | 58 | 49 | 45 |

The above tables disclose the formulations of three samples of polyvinyl chloride compositions, with samples H and I containing a secondary stabilizer within the scope of my invention. The secondary stabilizer in sample H is the resinous ester of mercapto ethanol and adipic acid, whereas the secondary stabilizer of sample I is a resinous ester of mercapto ethanol and succinic acid. Sheets of the above compositions were prepared and subjected for six hours to an air oven and the amount of blue light reflected measured. As may be seen from the above table, sample G, which did not contain a secondary stabilizer, reflected only 27% of blue light, and samples H and I, which contained secondary stabilizers of my invention, reflected 52% and 45% of blue light respectively.

It is readily seen from the above examples that the addition of resinous esters of mercapto alcohols and dicarboxylic acids to chlorine-containing vinyl resins serves to reduce decomposition and the resulting discoloration caused by heat, oxidation or by the instability of the various modifiers in the composition. In each of the above examples, the samples containing a secondary stabilizer were tested for objectionable odors, and in each instance no trace was noticed.

The secondary stabilizers of this invention may be employed in combination with any primary stabilizer for vinyl chloride resins. The more widely known primary stabilizers include the organo-tin compounds, such as dibutyl tin dilaurate and dibutyl tin maleate; lead compounds, such as lead carbonate, tribasic lead sulfate, litharge, lead salicylate, lead maleate, dibasic lead phosphite, dibasic lead phthalate; alkaline metal salts, such as sodium carbonate, trimagnesium phosphate and calcium stearate; and epoxy compounds, such as glycidyl oleate, the diglycidyl ethers of diphenols, and glycidyl sorbate dimer. A primary stabilizer may be defined as any base-reacting substance which absorbs substantially all of the hydrochloric acid formed by decomposition of the resin and thus prevents the catalytic effect of hydrochloric acid on the various degradation reactions.

The invention is not restricted to plastic compositions containing di(2-ethylhexyl)phthalate and is broadly useful in improving the color and odor of vinyl chloride resins containing other plasticizers, such as monomeric or polymeric esters of mono and difunctional acids and alcohols; esters of mono and difunctional acids and ether-alcohols, such as di(butoxyethyl)phthalate; epoxy compounds, such as glycidyl oleate and epoxidized soy bean oil; esters of alcohols and phosphoric acid, such as tri-(2-ethylhexyl)phosphate and diphenyl mono-octyl phosphate.

It is to be understood that the secondary stabilizers of the present invention may be advantageously employed with all the vinyl chloride compositions including the well known copolymer compositions; the invention being primarily directed to the discovery that resinous esters of mercapto alcohols and dicarboxylic acids have been found to be so unexpectedly efficient in their stabilizing capacity that only small amounts thereof are employed.

As it is possible to obtain various embodiments of the invention without departing from the spirit and scope thereof, it is to be understood that no limitations are intended except as appear in the appended claims.

I claim:

1. A composition of matter comprising a chlorine-containing polyvinyl resin and from 0.01% to 5% by weight of the resin of a polyester condensation product of an aliphatic mercapto alcohol and a dicarboxylic acid, said dicarboxylic acid having the carboxylic acid radicals thereof joined by a hydrocarbon group.

2. A composition of matter comprising a plasticized vinyl chloride resin and from 0.01% to 5% by weight of the resin of a polyester condensation product of an aliphatic mercapto alcohol and a dicarboxylic acid, said dicarboxylic acid having the carboxylic acid radicals thereof joined by a hydrocarbon group.

3. A composition of matter comprising a plasticized vinyl chloride resin, said resin containing from 10% to 100% of polymerized vinyl chloride, and from 0.01% to 5% by weight of the resin of a polyester condensation product of an aliphatic mercapto alcohol and a dicarboxylic acid, said dicarboxylic acid having the carboxylic acid radicals thereof joined by a hydrocarbon group.

4. A composition of matter comprising a plasticized vinyl chloride resin, a stabilizer capable of combining with hydrogen chloride, and from 0.01% to 5% by weight of the resin of a second stabilizer, said second stabilizer consisting of a polyester condensation product of an aliphatic mercapto alcohol and a dicarboxylic acid, said dicarboxylic acid having the carboxylic acid radicals thereof joined by a hydrocarbon group, the composition being characterized by stability against chemical decomposition and the development of color and odor resulting from heat and oxidation.

5. A composition of matter comprising a plasticized vinyl chloride resin, a stabilizer capable of combining with hydrogen chloride, and from 0.01% to 5% by weight of the resin of a second stabilizer, said second stabilizer consisting of a polyester condensation product of mercapto ethanol and an aliphatic dicarboxylic acid, said dicarboxylic acid having the carboxylic acid radicals thereof joined by an aliphatic hydrocarbon group, the composition being characterized by stability against chemical decomposition and the development of color and odor resulting from heat and oxidation.

6. A composition of matter comprising a plasticized vinyl chloride resin, a lead stabilizer, and from 0.01% to 5% by weight of the resin of a polyester condensation product of an aliphatic mercapto alcohol and a dicarboxylic acid, said dicarboxylic acid having the carboxylic acid radicals thereof joined by a hydrocarbon group, the composition being characterized by stability against chemical decomposition and the development of color and odor resulting from heat and oxidation.

7. A composition of matter comprising a plasticized vinyl chloride resin, a lead stabilizer, and from 0.01% to 5% by weight of the resin of a polyester condensation product of mercapto ethanol and maleic acid, the composition being characterized by stability against chemical decomposition and the development of color and odor resulting from heat and oxidation.

8. A composition of matter comprising a plasticized vinyl chloride resin, a lead stabilizer, and from 0.01% to 5% by weight of the resin of a polyester condensation product of mercapto ethanol and malonic acid, the composition being characterized by stability against chemical decomposition and the development of color and odor resulting from heat and oxidation.

9. A composition of matter comprising a plasticized vinyl chloriide resin, a lead stabiilzer, and from 0.01% to 5% by weight of the resin of a polyester condensation product of mercapto ethanol and adipic acid, the composition being characterized by stability against chemical decomposition and the developement of color and odor resulting from heat and oxidation.

10. A composition of matter comprising a plasticized vinyl chloride resin, a lead stabilizer, and from 0.01% to 5% by weight of the resin of a polyester condensation product of mercapto ethanol and succinic acid, the composition being characterized by stability against chemical decomposition and the development of color and odor resulting from heat and oxidation.

11. A composition of matter comprising a plasticized vinyl chloride resin, a stabilitzer to inhibit decomposition of said plasticized vinyl chloride resin caused by the liberation of hydrogen chloride when such resin is subject to elevated temperatures, and from 0.01% to 5% by weight of the resin of a second stabilizer, said second stabilizer consisting of a polyester condensation product of an alkyl mercapto alcohol and an aliphatic dicarboxylic acid, said dicarboxylic acid having the carboxylic acid radicals thereof joined by an aliphatic hydrocarbon group, the composition being characterized by stability against chemical decomposition and the development of color and odor resulting from heat and oxidation.

12. A composition of matter comprising a plasticized vinyl chloride copolymer resin, said resin containing from 70% to 98% of polymerized chloride and from .01% to 5% by weight of the resin of a polyester condensation product of an aliphatic mercapto alcohol and an aliphatic dicarboxylic acid, said dicarboxylic acid having the carboxylic acid radicals thereof joined by an aliphatic hydrocarbon group.

13. A composition of matter comprising a polyvinyl chloride resin stabilized against decomposition caused by the liberation of hydrogen chloride from said resin and from 0.01% to 5% by weight of the resin of a polyester condensation product of an aliphatic mercapto alcohol and an aliphatic dicarboxylic acid, said dicarboxylic acid having the carboxylic acid radicals thereof joined by an aliphatic hydrocarbon group.

14. A composition of matter comprising a plasticized vinyl chloride resin, a lead stabilizer, and from 0.01% to 5% by weight of the resin of a polyester condensation product of an aliphatic mercapto alcohol and an aliphatic dicarboxylic acid, said dicarboxylic acid having the carboxylic acid radicals thereof joined by an aliphatic hydrocarbon group, the composition being characterized by stability against chemical decomposition and the development of color and odor resulting from heat and oxidation.

15. A composition of matter comprising a plasticized vinyl chloride resin, a metal salt stabilizer, and from 0.01% to 5% by weight of the resin of a polyester condensation product of an aliphatic mercapto alchohol and an aliphatic dicarboxylic acid, said dicarboxylic acid having the carboxylic acid radicals thereof joined by an aliphatic hydrocarbon group, the composition being characterized by stability against chemical decomposition and the development of color and odor resulting from heat and oxidation.

16. A composition of matter comprising a chlorine containing vinyl resin which tends to liberate hydrogen chloride on exposure to heat or light, a stabilizer capable of combining with said liberated hydrogen chloride, and from 0.01% to 5% by weight of the resin of a polyester condensation product of an aliphatic mercapto alcohol and an aliphatic dicarboxylic acid, said dicarboxylic acid having the carboxylic acid radicals thereof joined by an aliphatic hydrocarbon group.

17. A composition of matter comprising a chlorine containing polyvinyl resin and from 0.01% to 5% by weight of the resin of a polyester condensation product of an aliphatic mercapto alcohol and an aliphatic dicarboxylic acid, said dicarboxylic acid having the carboxylic acid radicals thereof joined by an aliphatic hydrocarbon group.

References Cited in the file of this patent

UNITED STATES PATENTS

| | | |
|---|---|---|
| 2,219,463 | Yngve | Oct. 29, 1940 |
| 2,527,374 | Patrick et al. | Oct. 24, 1950 |